United States Patent [19]
Reef et al.

[11] Patent Number: 5,667,366
[45] Date of Patent: Sep. 16, 1997

[54] JET PUMP INCLUDING FLEXIBLE VENTURI

[75] Inventors: Martin J. Reef, Gronausestraat; Ronald H. Houpst, Boddenkampsingel; Frank T. G. Mulder, Richterstraat, all of Netherlands

[73] Assignee: Vernay Laboratories, Inc., Yellow Springs, Ohio

[21] Appl. No.: 566,046

[22] Filed: Dec. 1, 1995

[51] Int. Cl.[6] .................................. F04F 5/44; F04F 5/48
[52] U.S. Cl. ........................................ 417/198; 417/186
[58] Field of Search ................................. 417/186, 198

[56] References Cited

U.S. PATENT DOCUMENTS

| 4,595,344 | 6/1986 | Briley | 417/198 |
| 5,133,324 | 7/1992 | Michiaki | 123/514 |

FOREIGN PATENT DOCUMENTS

| 121300 | 5/1991 | Japan | 417/198 |
| 2196914 | 5/1988 | United Kingdom . | |

*Primary Examiner*—Charles G. Freay
*Attorney, Agent, or Firm*—Biebel & French

[57] ABSTRACT

A jet pump for use in a fuel tank wherein the jet pump includes a flexible venturi. The flexible venturi provides a variable area orifice to accommodate a large range of flow rates while providing a venturi effect throughout the range of flow rates. In addition, the flexible venturi is preferably a duckbill valve such that the venturi provides a check valve function for preventing reverse flow through the venturi. The duckbill valve is also preferably provided in combination with an umbrella valve wherein the umbrella valve provides a pressure limiting function for a fluid supply line connected to the venturi.

18 Claims, 3 Drawing Sheets

JET PUMP INCLUDING FLEXIBLE VENTURI

BACKGROUND OF THE INVENTION

The present invention relates to a jet pump, and more particularly, to a jet pump for use with an in-tank fuel pump system for an automobile.

In recent years, an increasing number of automobiles have included fuel systems wherein the fuel pump for the system is incorporated within the fuel tank of the automobile. In such systems, the fuel pump is typically located within a canister in the fuel tank and the canister is overfilled with fuel supplied from a fuel return line for returning an oversupply of fuel from the automobile's engine. As the fuel returns from the engine through the return line, it is typically caused to pass through a venturi orifice and into an inlet passage leading into the canister. The inlet passage is submerged in fuel within the fuel tank and the fuel exiting the venturi orifice creates a pressure drop in the area of the inlet passage such that additional fuel from the fuel tank is conveyed into the canister along with fuel jetted from the venturi orifice into the inlet passage. The amount of fuel returning through the fuel return line generally varies from between 20 to 180 liters/hr. Currently, venturis are of a low performance design wherein the average aspirated fuel is sufficient to keep the fuel canister filled under most operating conditions. However, there is a trend toward providing higher performance venturis which maintain sufficient canister filling at fuel return line flow rates as low as 20 liters/hr.

The venturis currently in use are generally formed as fixed nozzles wherein the orifice size is optimized for the anticipated use. In order for the venturi to draw sufficient fuel into the canister from the fuel tank along with the fuel stream from the venturi, it is necessary to select a small enough orifice size for the venturi to provide the required pressure drop across the orifice to draw fuel from the fuel tank into the inlet passage of the canister. Thus, in order to increase the flow rate of fuel into the canister at low fuel return line pressures, it is necessary to decrease the orifice size of the venturi whereby a larger pressure drop across the venturi orifice is obtained and a larger flow of fuel from the fuel tank is drawn into the canister inlet passage.

A short coming of the present jet pump designs is that as the venturi orifice size is decreased, the back pressure within the fuel return line is increased. Accordingly, when the venturi orifice size is optimized for low fuel return line flow rates, there is a danger of an excessive back pressure being produced when the flow rate through the fuel return line increases to its maximum value. This is particularly critical in applications wherein the fuel return line is formed of plastic and may crack or rupture as a result of excessive pressure.

An additional desired characteristic of in-tank fuel pump systems is the provision of a check valve or other means for preventing flow in a reverse direction from the tank through the fuel return line. Such a check valve should be preferably incorporated into the venturi structure to minimize complexity of the fuel system.

SUMMARY OF THE INVENTION

The present invention provides a jet pump structure for an automobile fuel system wherein a flexible venturi is provided for achieving optimal filling of a canister containing the fuel pump for the system.

The flexible venturi of the present system is formed of an elastomeric material wherein an orifice of the venturi opens in proportion to the flow through the fuel return line for the system. The venturi comprises a normally closed valve, such as a duckbill valve, whereby the enclosed orifice of the venturi prevents backflow through the fuel return line in the event of a negative pressure differential. A duckbill type valve structure is preferable for the present venturi in that such a structure provides a natural jet function, even at low flow rates, and the valve opens gradually as the flow rate through the valve increases such that variations in the pressure differential across the valve are minimized with increasing flow rates through the fuel return line. In this manner, the pressure within the fuel return line is maintained at a lower value for high flow rates than that provided by fixed orifice nozzles.

The flexible venturi may be provided in combination with a pressure limiter such as an umbrella valve wherein the pressure limiter is actuated upon the pressure within the fuel return line reaching a predetermined value. When the predetermined pressure value is obtained, the pressure limiter will cause fluid within the fuel return line to exit the return line and bypass the venturi.

The flexible venturi and pressure limiter are preferably formed integrally with each other, and may be in the form of a combination duckbill and umbrella valve. The combination valve is supported on a venturi mount which includes a central passage for supplying fluid to the flexible venturi and includes radially located apertures for directing fluid to the umbrella valve.

Therefore, it is an object of the present invention to provide a jet pump for use in a fuel system including a flexible venturi which provides a check valve function.

It is a further object of the invention to provide such a jet pump wherein the flexible venturi facilitates regulation of fluid pressure in a fuel return line.

It is yet another object of the invention to provide such a jet pump including a pressure limiter for relieving pressure in the fuel return line.

Other objects and advantages of the invention will be apparent from the following description, the accompanying drawings and the appended claims.

DETAILED DESCRIPTION OF THE PREFERRED EMBODIMENT

Figure 1:
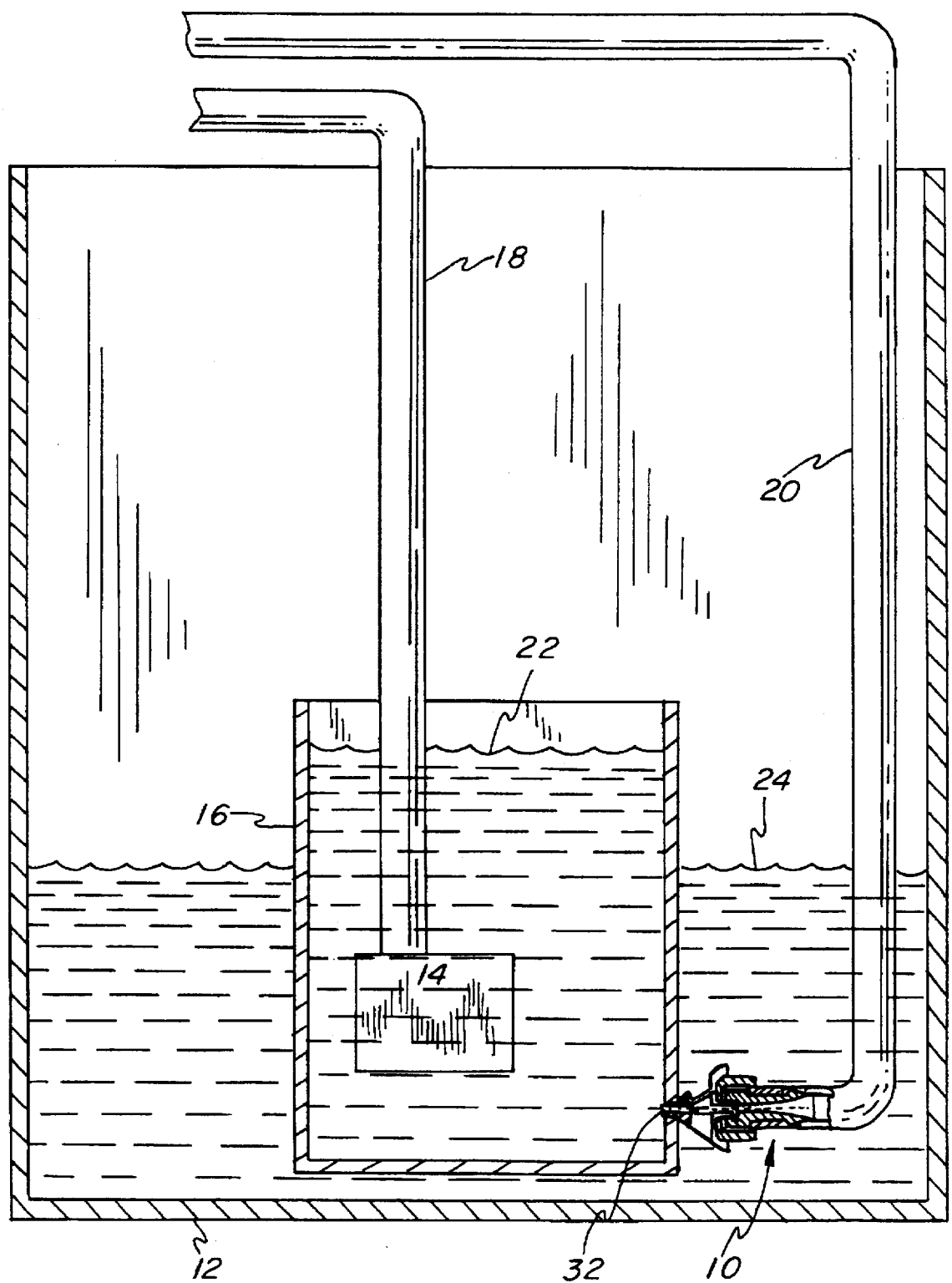
FIG. 1 illustrates the jet pump of the present invention in cross section in combination with a fuel system.

Referring to FIG. 1, the jet pump 10 of the present invention is shown in combination with an automobile fuel system including a fuel tank 12 and a fuel pump 14 contained within a canister 16. The fuel pump 14 supplies fuel from the canister 16 to an engine (not shown) through a supply line 18. Excess fuel from the engine is returned to the fuel tank 12 through a return supply line 20. The supply line 20 is connected to the jet pump 10 for feeding the fuel from the supply line 20 into the canister 16 along with additional fuel from the fuel tank 12 surrounding the jet pump 10. The jet pump 10 will generally provide an oversupply of fuel to the canister 16 such that the fluid level 22 of fuel within the canister 16 may exceed the fluid level 24 of the fuel exterior of the canister 16.

Figure 2:
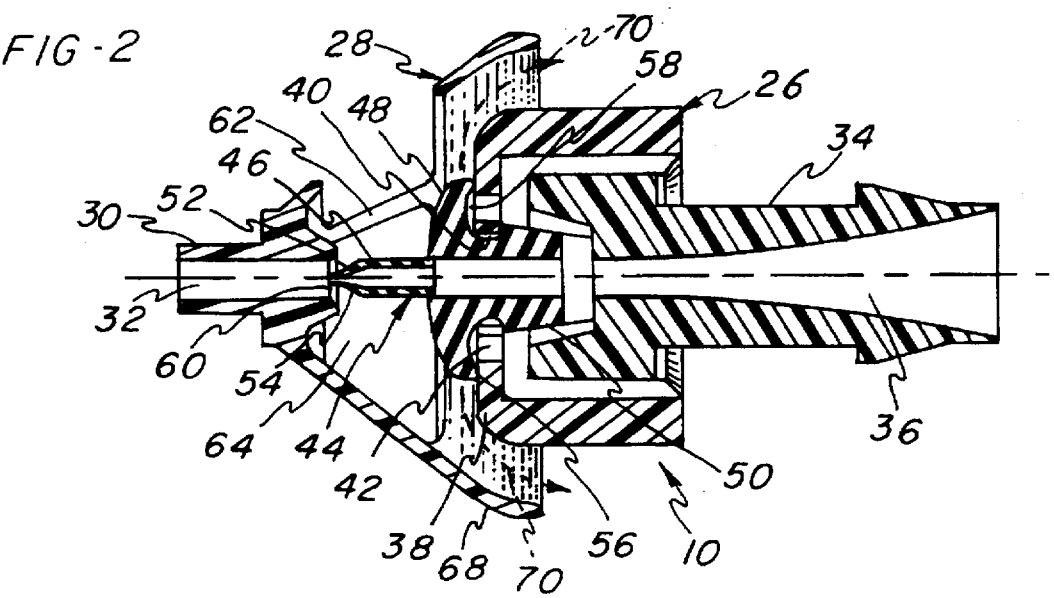
FIG. 2 is an enlarged cross sectional view of the jet pump of the present invention.

Referring to FIG. 2, an enlarged view of the jet pump 10 is shown. The jet pump 10 includes a venturi mount 26 supported on a housing 28. The housing 28 includes a forward end 30 defining an inlet passage 32. The inlet passage 32 is adapted to be placed in fluid communication with the interior of the canister 16, as illustrated in FIG. 1.

The venturi mount 26 includes a fluid supply end 34 defining a central fluid supply passage 36. The venturi mount 26 further includes a valve seat 38 mounted to the end 34 and in engagement with the housing 28. The valve seat 38 includes a central opening 40 and a plurality of radially located vent apertures 42 surrounding the opening 40.

A flexible venturi 44 is positioned on the valve seat 38 and is configured as a combination valve including a duckbill valve 46 defining a venturi nozzle and an umbrella valve 48 defining a pressure limiter. The duckbill valve 46 and umbrella valve 48 are preferably formed integrally with each other of an elastomeric material, such as a fluorosilicon rubber material. Further, a portion 50 of the venturi 44 is formed with an enlarged cross section for engaging a cooperating inner surface of the valve seat 38 to thereby hold the venturi 44 in position in the opening 40.

The duckbill valve 46 includes a pair of generally planar lips 52, 54 which converge down to a normally closed slit opening. The lips 52, 54 are connected by curved side walls and will move apart from each other in response to a fluid pressure applied against the inside of the valve 46.

The umbrella valve 48 includes a contact surface 56 extending around the periphery of the valve 48 and contacting the valve seat 38. A chamber 58 is defined within the periphery 56 in fluid communication with the vent openings 42. The umbrella valve provides a preload along the periphery 56 such that fluid will be prevented from flowing through the vent openings 42, into the chamber 58 and out past the periphery 56. Upon exertion of a predetermined fluid pressure within the chamber 58, the periphery 56 will lift from the valve seat 38 to permit fluid flow past the umbrella valve 48, such that the umbrella valve 48 performs a pressure limiting function for fluid pressure within the central passage 36.

The outlet end of the duckbill valve 46 is located at an inlet end 60 of the inlet passage 32 to thereby ensure that fluid flowing from the valve 46 will pass directly into the inlet passage 32. The housing 28 is provided with at least one opening 62 between the inlet passage 32 and the venturi mount 26 for permitting fluid within the fuel tank 12 to be in fluid communication with the inlet passage 32. The fluid passing through the duckbill valve 46 produces a pressure drop as it exits the valve 46 such that fluid within the area 64 of the housing 28 surrounding the valve 46 will be drawn into the inlet passage 32 along with the fluid passing through the flexible venturi 44.

Figure 3:
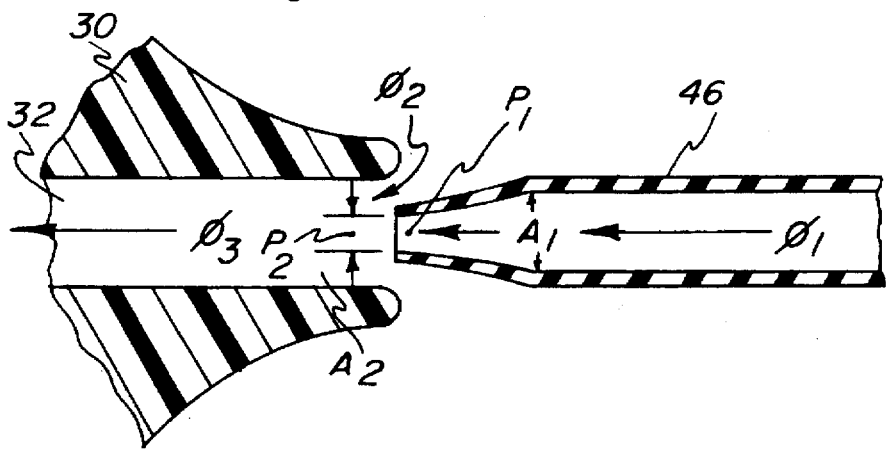
FIG. 3 is a diagrammatic view depicting fluid flows around the venturi of the jet pump.

Referring to FIG. 3, the principles controlling the fluid flow into the inlet passage 32 will be described. The fluid flowing through the venturi nozzle 46 is designated as $\phi_1$ and comprises a primary fluid flow into the inlet passage 32. A secondary flow into the inlet passage 32 is designated as $100_1$ and comprises fluid flowing from outside areas surrounding the end of the nozzle 46. The total flow through the inlet passage 32 will be $\phi_1$ plus $\phi_2$. Generally, the fluid flow $\phi_2$ results from a venturi effect produced by the fluid flow $\phi_1$ as it passes from the inside to the outside of the nozzle 46. As in conventional venturi nozzles, fluid flow through the nozzle 46 is restricted down from a large area $A_1$ to a reduced area $A_2$ whereby a pressure differential is produced with a greater pressure $P_1$ upstream of the nozzle orifice than the pressure $P_2$ downstream of the nozzle orifice. The resulting pressure $P_2$ is less than the pressure of the fluid within the tank such that fluid from the tank will be drawn into the inlet passage 32 along with the fluid flow from the nozzle 46. In conjunction with the pressure change from $P_1$ to $P_2$, the fluid flow undergoes a change in velocity in accordance with known principles of fluid behavior such that the nozzle 46 causes a jetting of fluid into the inlet passage 32.

Figure 5:
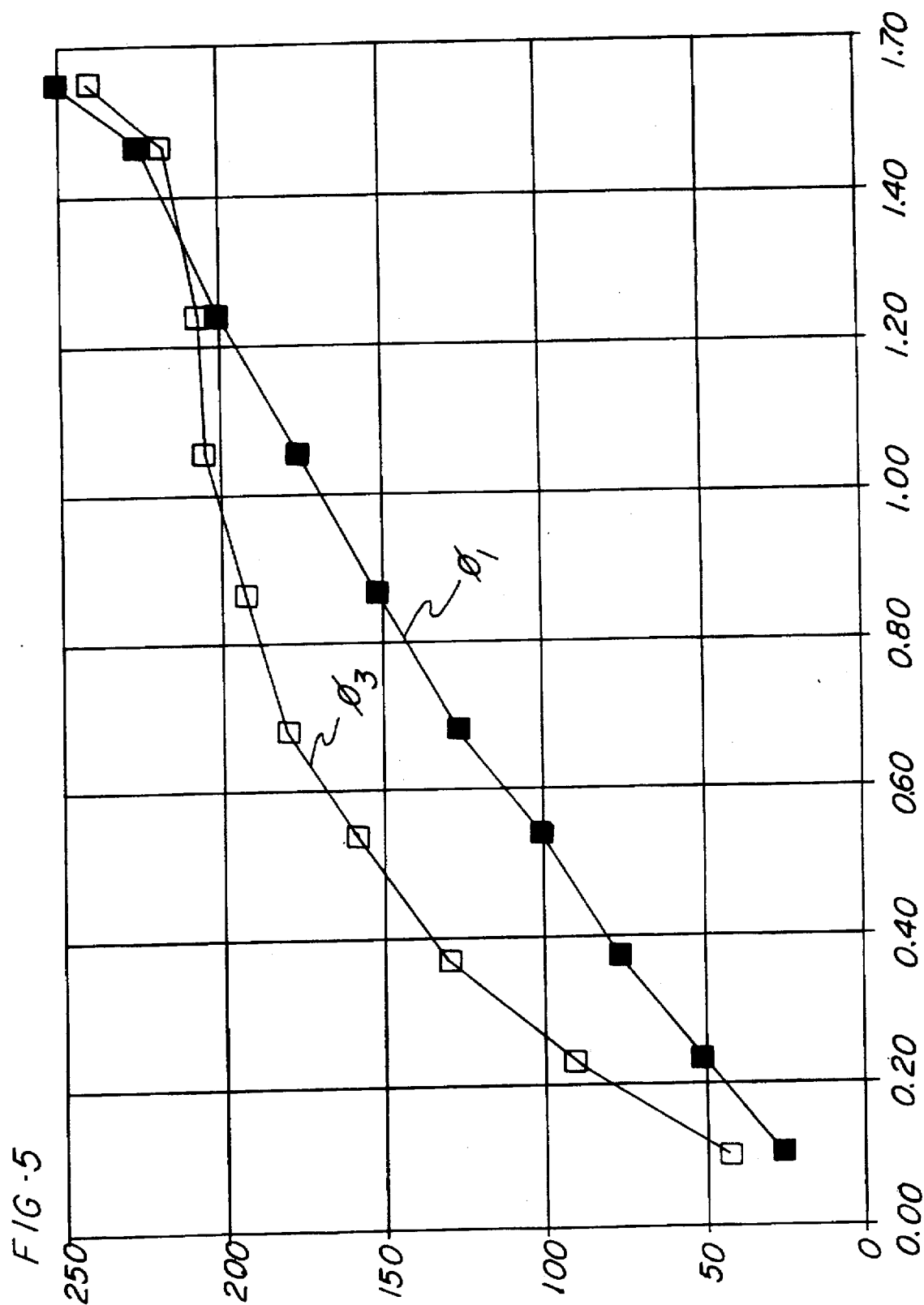
FIG. 5 is a graph illustrating fluid flows produced by the present jet pump.

The present nozzle 46 optimizes the fluid flow into the inlet passage 32 in that the area $A_2$ is variable whereby a jetting of fluid, and therefore a pressure differential, will be produced for fluid exiting the orifice of the nozzle 46 even at low pressures. Further, while the pressure differential across the nozzle orifice will increase with an increase in the fluid flow rate $\phi_1$, changes in the pressure differential will be less than that which would be produced by a nozzle having a fixed outlet orifice. This is desirable in that the orifice area $A_2$ will increase to limit the amount of pressure produced in the return line 20 in order to reduce the possibility of excessive pressure damaging the line 20. In addition, as the flow rate $\phi_1$ increases to a high flow rate close to the maximum desired for the inlet flow rate $\phi_3$, the increasing area $A_2$ will cause less of a pressure drop across the orifice whereby the secondary flow $\phi_2$ supplementing the primary flow rate $\phi_1$ will be reduced. Thus, the present nozzle arrangement provides a more constant final flow rate $\phi_3$ throughout a range of flow rates for the primary flow $\phi_1$. In other words, the flow curve $\phi_3$, as seen in FIG. 5, is more horizontal during increases in the primary flow rate $\phi_1$.

Figure 4:
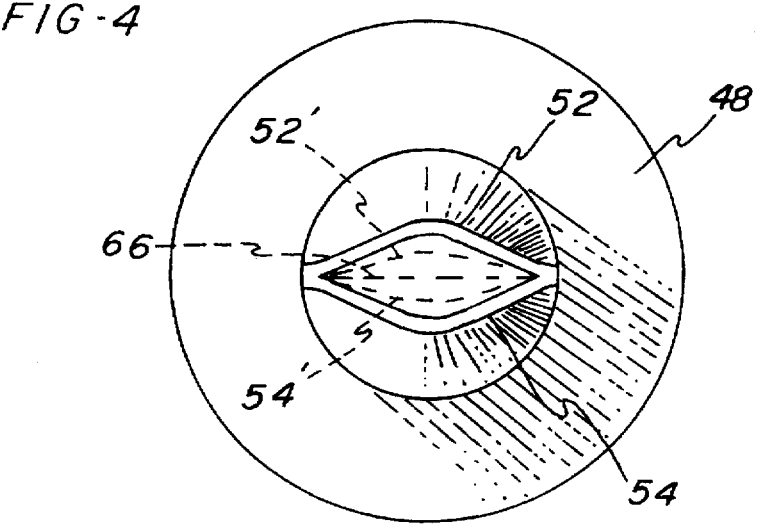
FIG. 4 is an enlarged end view depicting open positions of the venturi.

FIG. 4 illustrates the valve lips 52, 54 in an open position providing a high flow rate through the nozzle 46. The dotted lines 52', 54' are illustrative of an intermediate position of the valve lips, which position will be assumed at a reduced flow rate. The central dotted line 66 illustrates a closed position for the valve lips 52, 54 whereby the nozzle 46 presents a closed orifice to fluid flow. The valve lips 52, 54 will typically assume the position 66 when no fluid flow occurs through the nozzle 46, as well as when a negative pressure is applied across the nozzle 46 such that the lips 52, 54 provide a check valve function for preventing a reverse flow in a direction opposite to that of $\phi_1$.

It should be noted that in addition to the flexible venturi 44 acting to limit the pressure produced behind the venturi 44 through enlargement of the orifice area $A_2$, the umbrella valve 48 is provided for releasing pressure produced in the central passage 36 just prior to a maximum pressure being obtained. In this manner, regulation of the pressure within the central passage 36 and return line 20 is ensured to thereby prevent damage to the return line. It should also be noted that the housing 28 may be so constructed as to direct fluid flow exiting from the umbrella valve 48 such that it does not interfere with the secondary fluid flow $\phi_2$ around the end of the nozzle 46. This may be accomplished by providing an inwardly angled housing portion 68 at areas surrounding the periphery 56 of the umbrella valve 48 whereby fluid released by the umbrella valve 48 will follow a path generally depicted by dotted arrows 70.

In a practical example of the present invention, the maximum pressure produced in the flow return line 20 will be 1.2 to 1.5 bar. Further, the jet pump 10 must provide a venturi flow effect for flows as low as 20 liters/hr and be able to handle flows as high as 180 liters/hr while providing a final flow into the inlet passage as close to 250 liters/hr as possible.

FIG. 5 illustrates a flow curve produced by a jet pump in accordance with the present invention wherein the final flow $\phi_3$ is compared to the primary flow $\phi_1$ and the flow rates are charted as a function of the pressure within the return line 20. It can be seen that the flow rate $\phi_3$ flattens out as a maximum desired pressure is reached and the umbrella valve 48 opens to relieve the line pressure. In addition, it should be apparent that the flow $\phi_1$ provides an increase in the final flow $\phi_3$ as it combines with the flow $\phi_2$ such that the resultant flow $\phi_3$ rises to its maximum value at an increased rate.

Although the present invention has been described with reference to use of a duckbill valve as the flexible venturi, it should be noted that other flexible venturi constructions may be used to obtain the same effects as the present invention. The present duckbill construction for the venturi is desirable in that it provides a check valve function for preventing backflow through the return line. In addition the use of a duckbill valve is advantageous in that it provides a more laminar flow and also provides a capability for handling a wide range of flow rates while providing a venturi effect throughout the range of flow rates.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A jet pump comprising:
   a fluid receiving structure including an inlet passage;
   a primary fluid source directing a fluid flow in a first direction into said inlet passage;
   a secondary fluid source in fluid communication with fluid flow from said primary fluid source wherein fluid flow from said primary fluid source causes fluid from said secondary fluid source to flow in said first direction into said inlet passage;
   said primary fluid source including a flexible venturi providing a variable outlet area for fluid flow from said primary fluid source to said inlet passage; and
   wherein said flexible venturi defines a check valve for preventing fluid flow in a second direction, opposite said first direction, into said primary fluid source.

2. The jet pump as in claim 1 wherein said flexible venturi comprises a normally closed valve.

3. The jet pump as in claim 2 wherein said flexible venturi comprises a duckbill valve.

4. The jet pump as in claim 1 wherein said primary fluid source includes a fluid supply line and said flexible venturi operates to limit fluid pressure in said fluid supply line.

5. The jet pump as in claim 1 wherein said primary fluid source includes a fluid supply line and including a pressure limiter in fluid communication with fluid in said supply line to direct fluid flow from said venturi nozzle when a predetermined pressure is obtained in said fluid supply line.

6. The jet pump as in claim 5 wherein said pressure limiter comprises an umbrella valve.

7. The jet pump as in claim 6 wherein said flexible venturi and said pressure limiter are formed as a combination valve.

8. The jet pump as in claim 5 wherein said pressure limiter comprises a valve member formed of a resilient material and including a contact surface in contact with a valve seat, said contact surface moving away from said valve seat in response to said predetermined pressure.

9. The jet pump as in claim 5 wherein said pressure limiter is formed integrally with said flexible venturi.

10. A jet pump comprising:
    a fluid receiving structure including an inlet passage;
    a fluid supply line for conveying fluid;
    a venturi connected to said fluid supply line wherein said venturi is located for directing a flow of fluid in a first direction into said inlet passage;
    a secondary fluid supply area in fluid communication with said venturi and said inlet passage for supplying additional fluid to said flow of fluid from said venturi in said first direction;
    a pressure limiter located in fluid communication with fluid in said fluid supply line, said pressure limiter causing fluid flow in said fluid supply line to bypass said venturi when a predetermined pressure is obtained in said fluid supply line; and
    wherein said venturi is formed integrally with said pressure limiter.

11. The jet pump as in claim 10 wherein said venturi forms a check valve for preventing fluid flow in a second direction, opposite said first direction, into said fluid supply line.

12. The jet pump as in claim 10 wherein said venturi comprises a flexible member whereby an outlet area for said venturi is variable.

13. The jet pump as in claim 12 wherein said venturi comprises a duckbill valve.

14. The jet pump as in claim 10 wherein said pressure limiter comprises an umbrella valve.

15. The jet pump as in claim 10 wherein said pressure limiter comprises a valve member formed of a resilient material and including a contact surface in contact with a valve seat, said contact surface moving away from said valve seat in response to said predetermined pressure.

16. A jet pump comprising:
    a fluid receiving structure including an inlet passage;
    fluid supply line for conveying fluid;
    a venturi connected to said fluid supply line wherein said venturi is located for directing a flow of fluid in a first direction into said inlet passage;
    secondary fluid supply area in fluid communication with said venturi and said inlet passage for supplying additional fluid to said flow of fluid from said venturi in said first direction;
    a pressure limiter located in fluid communication with fluid in said fluid supply line, said pressure limiter causing fluid flow in said fluid supply line to bypass said venturi when a predetermined pressure is obtained in said fluid supply line; and
    wherein said pressure limiter comprises an umbrella valve which remains closed until said predetermined pressure is obtained.

17. A jet pump comprising:
    a fluid receiving structure including an inlet passage;
    a fluid supply line for conveying fluid;
    a venturi connected to said fluid supply line wherein said venturi is located for directing a flow of fluid in a first direction into said inlet passage;

a secondary fluid supply area in fluid communication with said venturi and said inlet passage for supplying additional fluid to said flow of fluid from said venturi in said first direction;

a pressure limiter located in fluid communication with fluid in said fluid supply line, said pressure limiter causing fluid flow in said fluid supply line to bypass said venturi when a predetermined pressure is obtained in said fluid supply line; and including a venturi mount located at an end of said fluid supply line, said venturi mount including a central aperture for said venturi and a plurality of venting apertures surrounding said central aperture for conveying fluid into contact with said pressure limiter.

18. A jet pump comprising:

a housing defining an inlet passage;

a venturi mount supported on said housing;

a combination valve including a duckbill valve formed integrally with an umbrella valve, said combination valve mounted on said venturi mount such that an end of said duckbill valve is adjacent said inlet passage;

a fluid supply opening defined in said housing between said inlet passage and said venturi mount for permitting flow of fluid from a location outside said housing into said housing;

a fluid supply passage defined through said venturi mount for conveying fluid to said duckbill valve;

a plurality of apertures defined at radial locations around said venturi mount for conveying fluid from said fluid supply passage to said umbrella valve; and wherein said duckbill valve defines a venturi having a variable outlet area depending on a fluid pressure in said fluid supply passage, and said umbrella valve prevents flow through said plurality of apertures until a predetermined maximum pressure is obtained in said fluid supply passage whereupon said umbrella valve opens to provide a bypass for fluid in said fluid supply passage.

* * * * *